(12) United States Patent
Raether

(10) Patent No.: US 8,491,708 B2
(45) Date of Patent: Jul. 23, 2013

(54) NOZZLE ARRANGEMENTS AND METHOD FOR CLEANING FILTER ELEMENTS

(75) Inventor: Thomas D. Raether, St. Louis Park, MN (US)

(73) Assignee: Donaldson Company, Inc., Minneapolis, MN (US)

(*) Notice: Subject to any disclaimer, the term of this patent is extended or adjusted under 35 U.S.C. 154(b) by 0 days.

(21) Appl. No.: 13/292,588

(22) Filed: Nov. 9, 2011

(65) Prior Publication Data
US 2012/0067381 A1 Mar. 22, 2012

Related U.S. Application Data

(62) Division of application No. 11/946,951, filed on Nov. 29, 2007, now Pat. No. 8,075,648.

(60) Provisional application No. 60/867,844, filed on Nov. 30, 2006.

(51) Int. Cl.
*B01D 46/04* (2006.01)

(52) U.S. Cl.
USPC ............................................. 95/280; 55/302

(58) Field of Classification Search
USPC ............... 95/278–280; 96/428; 55/302–303, 55/341.1–341.7; 239/548–568; 134/34–37
See application file for complete search history.

(56) References Cited

U.S. PATENT DOCUMENTS

| | | | |
|---|---|---|---|
| 2,591,198 A | 4/1952 | Ringe | |
| 2,748,948 A | 6/1956 | Fricke et al. | |
| 2,836,257 A | 5/1958 | Muller | |
| 3,095,290 A | 6/1963 | Hockett | |
| 3,173,777 A | 3/1965 | Tamny | |
| 3,234,714 A | 2/1966 | Rymer et al. | |
| 3,325,978 A | 6/1967 | Rymer et al. | |
| 3,394,532 A | 7/1968 | Oetiker | |
| 3,402,881 A | 9/1968 | Moore et al. | |
| 3,487,609 A | 1/1970 | Caplan | |
| 3,499,268 A | 3/1970 | Pausch | |
| 3,508,383 A | 4/1970 | Humbert, Jr. et al. | |
| 3,509,698 A | 5/1970 | Medcalf et al. | |
| 3,535,852 A | 10/1970 | Hirs | |
| 3,692,184 A | 9/1972 | Miller, Jr. et al. | |
| 3,726,066 A | 4/1973 | Colley et al. | |
| 3,732,669 A | 5/1973 | Chambers | |
| 3,735,566 A | 5/1973 | Laliwala | |
| 3,757,497 A | 9/1973 | Ray | |

(Continued)

FOREIGN PATENT DOCUMENTS

| | | |
|---|---|---|
| DE | 1 228 130 | 11/1966 |
| DE | 1 407 933 | 4/1972 |

(Continued)

OTHER PUBLICATIONS

International Search Report, mailed May 14, 2008.

*Primary Examiner* — Duane Smith
*Assistant Examiner* — Thomas McKenzie
(74) *Attorney, Agent, or Firm* — Merchant & Gould P.C.

(57) ABSTRACT

A method of cleaning a filter element includes directing a jet of pressurized gas from a nozzle onto a filter element, with the jet having a non-round cross-sectional shape that is a same general cross-sectional shape as the opening in a tube sheet holding the filter element. The nozzle has a channel for the pressurized gas that is obstruction-free.

14 Claims, 16 Drawing Sheets

U.S. PATENT DOCUMENTS

| | | | |
|---|---|---|---|
| 3,774,847 A | 11/1973 | Malec | |
| 3,807,150 A | 4/1974 | Maracle | |
| 3,831,354 A | 8/1974 | Bakke | |
| 3,837,581 A | 9/1974 | Orsoff | |
| 3,853,508 A * | 12/1974 | Gordon et al. | 55/302 |
| 3,853,509 A | 12/1974 | Leliaert | |
| 3,874,857 A | 4/1975 | Hunt et al. | |
| 3,883,331 A | 5/1975 | Bernard et al. | |
| 3,942,962 A | 3/1976 | Duyckinck | |
| 4,067,498 A | 1/1978 | Holcomb | |
| 4,171,963 A | 10/1979 | Schuler | |
| 4,218,227 A | 8/1980 | Frey | |
| 4,227,903 A | 10/1980 | Gustavsson et al. | |
| 4,251,244 A | 2/1981 | Evenstad | |
| 4,272,262 A | 6/1981 | Britt et al. | |
| 4,277,260 A | 7/1981 | Browning | |
| 4,278,454 A | 7/1981 | Nemesi | |
| 4,280,826 A * | 7/1981 | Johnson, Jr. | 55/302 |
| 4,292,057 A | 9/1981 | Ulvestad et al. | |
| 4,306,893 A | 12/1981 | Fernando et al. | |
| 4,395,269 A * | 7/1983 | Schuler | 55/302 |
| 4,504,288 A | 3/1985 | Kreft | |
| 4,578,092 A | 3/1986 | Klimczak | |
| 4,632,680 A | 12/1986 | Klimczak | |
| 4,661,131 A * | 4/1987 | Howeth | 55/302 |
| 4,746,339 A | 5/1988 | Millard | |
| 4,790,485 A | 12/1988 | Yamamoto | |
| 4,820,320 A | 4/1989 | Cox | |
| 4,830,279 A | 5/1989 | Crum et al. | |
| 4,909,813 A | 3/1990 | Eggerstedt | |
| 4,955,996 A | 9/1990 | Edwards et al. | |
| 5,002,594 A | 3/1991 | Merritt | |
| 5,062,867 A * | 11/1991 | Klimczak | 95/280 |
| 5,062,872 A | 11/1991 | Williams | |
| 5,062,873 A | 11/1991 | Karlsson | |
| 5,233,940 A | 8/1993 | Berglund | |
| 5,393,327 A | 2/1995 | Chambers et al. | |
| 5,421,845 A | 6/1995 | Gregg et al. | |
| 5,562,746 A * | 10/1996 | Raether | 55/302 |
| 5,725,161 A | 3/1998 | Hartle | |
| 5,924,215 A | 7/1999 | Goodsell | |
| 5,980,598 A | 11/1999 | Horvat | |
| 6,090,173 A * | 7/2000 | Johnson et al. | 55/302 |
| 6,322,618 B1 | 11/2001 | Simms et al. | |
| 6,394,921 B1* | 5/2002 | Fukuda | 474/80 |
| 6,716,274 B2* | 4/2004 | Gogins et al. | 95/273 |
| 6,902,592 B2* | 6/2005 | Green et al. | 55/302 |
| 6,908,494 B2* | 6/2005 | Gillingham et al. | 55/283 |
| 7,008,465 B2* | 3/2006 | Graham et al. | 95/78 |
| 7,282,075 B2 | 10/2007 | Sporre et al. | |
| 7,371,267 B2* | 5/2008 | Pipkorn et al. | 55/379 |
| 7,918,907 B2* | 4/2011 | Bitner | 55/293 |
| 7,967,898 B2* | 6/2011 | Sporre et al. | 95/280 |
| 8,075,648 B2 | 12/2011 | Raether | |
| 2005/0120881 A1 | 6/2005 | Sporre et al. | |

FOREIGN PATENT DOCUMENTS

| | | |
|---|---|---|
| DE | 39 05 113 A1 | 8/1990 |
| DE | 196 18 377 A1 | 11/1996 |
| DE | 196 06 508 A1 | 8/1997 |
| EP | 0123 721 A1 | 9/1983 |
| FR | 1 184 609 | 7/1959 |
| FR | 1 413 752 | 11/1964 |
| FR | 1 590 764 | 4/1970 |
| FR | 2 401 690 | 3/1979 |
| GB | 326 047 | 3/1930 |
| GB | 662.358 | 12/1951 |
| GB | 781 194 | 8/1957 |
| GB | 838 523 | 6/1960 |
| GB | 880 043 | 10/1961 |
| GB | 914 187 | 12/1962 |
| GB | 939 641 | 10/1963 |
| GB | 948 705 | 2/1964 |
| GB | 1016556 | 1/1966 |
| GB | 1113154 | 5/1968 |
| GB | 1 220 174 | 1/1971 |
| GB | 1 345 977 | 2/1974 |
| GB | 2 195 558 A | 4/1988 |
| SU | 627841 | 10/1978 |

* cited by examiner

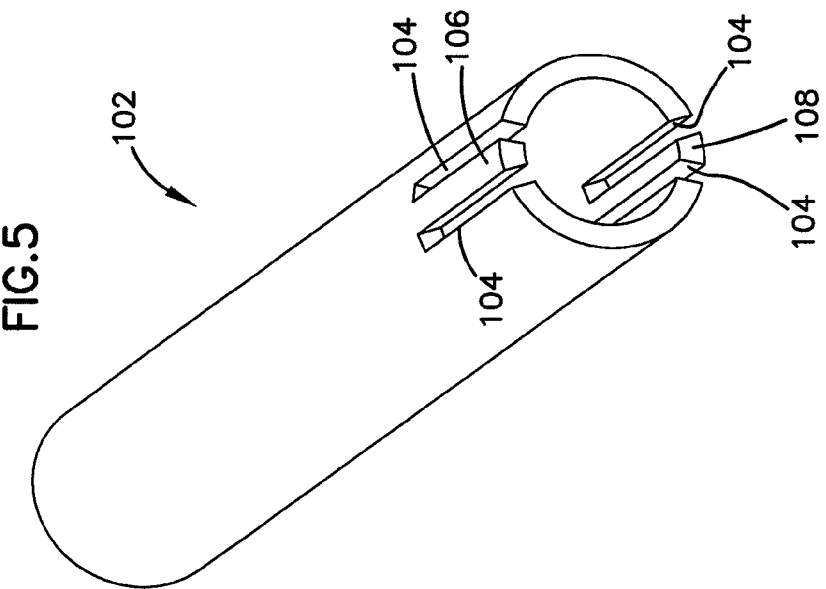
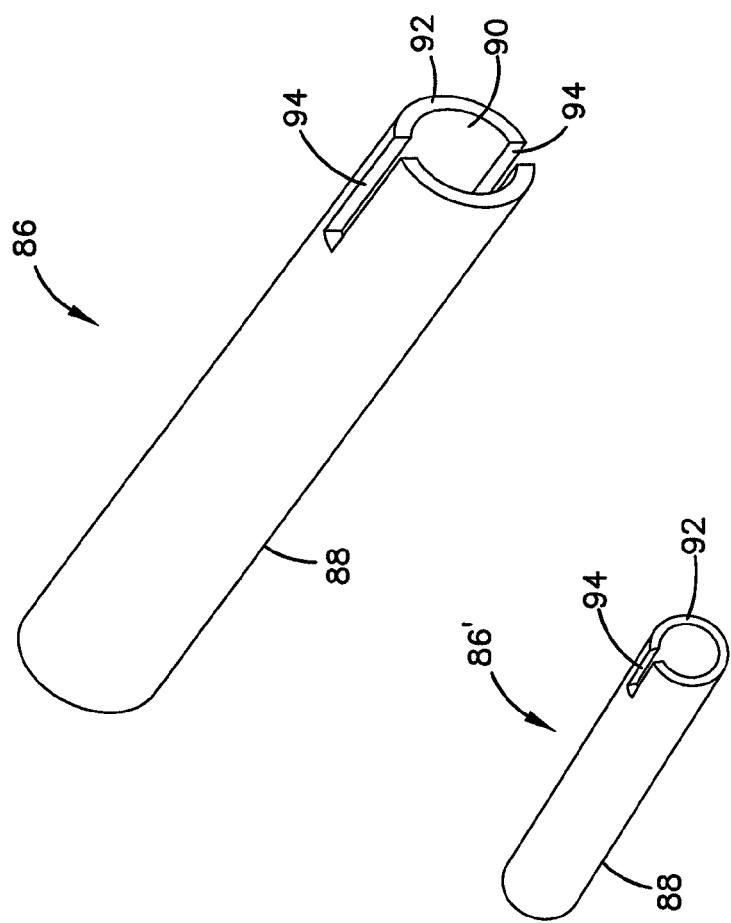

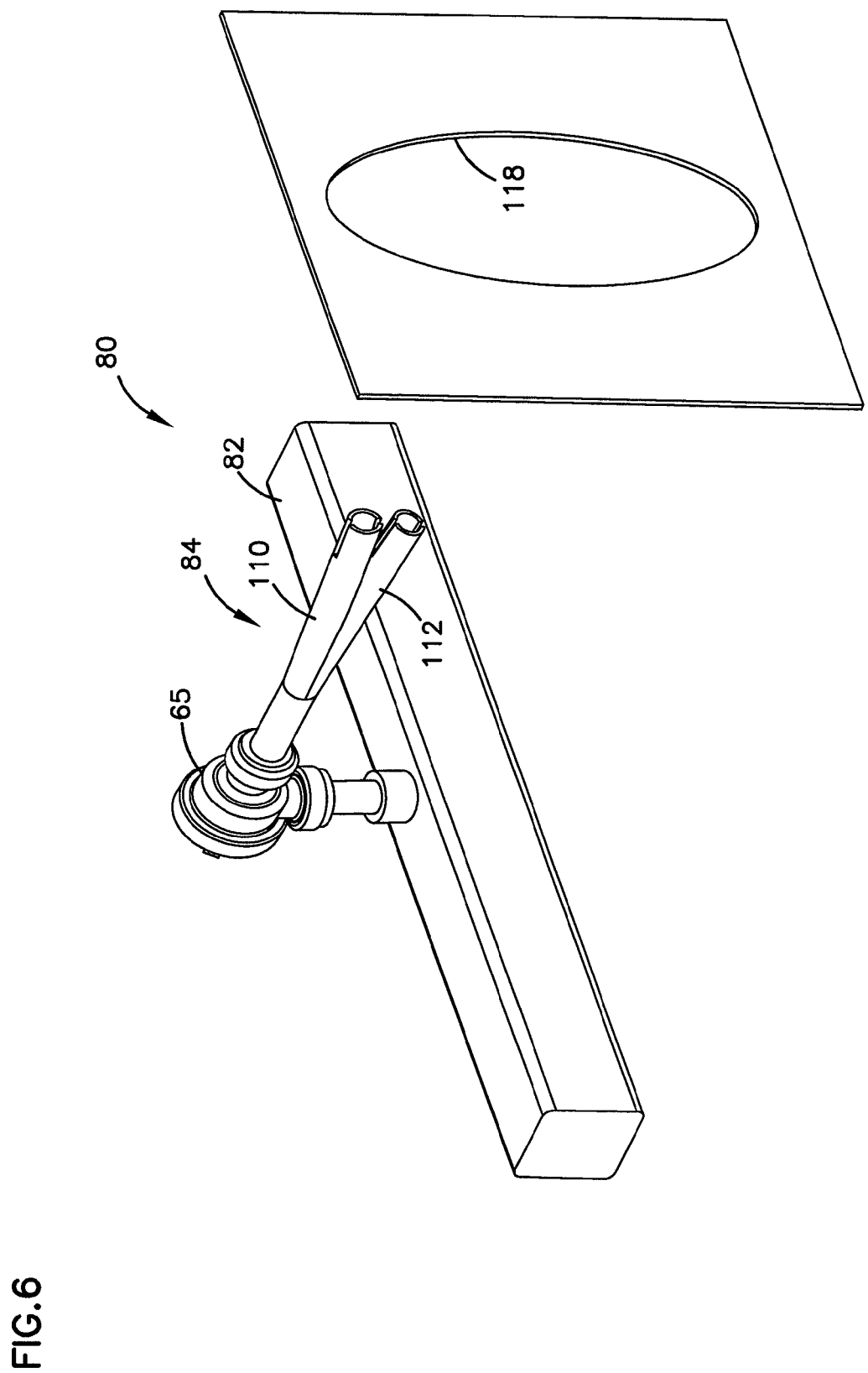

NOZZLE ARRANGEMENTS AND METHOD FOR CLEANING FILTER ELEMENTS

CROSS REFERENCE TO RELATED APPLICATION

This application is a divisional of U.S. patent application Ser. No. 11/946,951, filed Nov. 29, 2007, which is a utility application of U.S. Provisional Patent Application Ser. No. 60/867,844, filed Nov. 30, 2006, and which applications are hereby incorporated by reference in their entireties.

TECHNICAL FIELD

This disclosure relates to methods for cleaning filter elements utilizing pressurized gas generators, including nozzle arrangements designed to produce predetermined pulse shapes.

BACKGROUND

Dust collector devices sometimes use exhaust gas from a valve and pressure tank (reservoir) to back flush filters. Examples of such air filter assemblies are disclosed in, for example, U.S. Pat. Nos. 6,090,173; 4,218,227; 4,395,269; and patent application publication U.S. 2006/0112667 A1, each of these patent documents being incorporated by reference herein.

Proper and effective cleaning of these filters requires that the exhaust jet fill the opening of the filter to be cleaned. In many implementations, the opening of the filter corresponds to the opening in the tubesheet, in which the filter is mounted. This exhaust jet is naturally round and will effectively fill a round opening. The problem of filling a filter opening (or tubesheet opening, in which the filter is mounted) that has any shape other than round has been addressed in the past by placing a device in the direct path of the jet. Placing a jet in this location consumes a portion of the energy of the jet, causes turbulence, increases noise level, and only changes the shape of the jet for a small fraction of the pulse duration. These factors all contribute to poor cleaning effectiveness. Improvements are desirable.

SUMMARY

A method and arrangement is provided to effectively cover, with a shaped pulse, an oval, rectangular, triangular, and other non-round shaped tubesheet opening to clean most any filter of similar geometry including, for example, V-pack, tubular mini-V-pack, envelope bag, hemispherical, Z, panel, etc.

A method of cleaning a filter element includes directing a jet of pressurized gas from a nozzle onto a filter element. The jet has a non-round cross-sectional shape. The jet has a non-round cross-sectional shape that is the same general shape as a non-round shape of an opening in a tubesheet holding a filter element. The filter element can be any type of filter element that covers the opening in the tubesheet. The nozzle has a channel for the pressurized gas that is obstruction-free.

A method of designing a nozzle arrangement for directing a jet of pressurized gas into a non-round opening in a tubesheet with a non-round filter element is provided. The filter element can be either a tubular element having an open interior with a non-round cross-section; a panel element having a non-round face; a V-pack; an envelope bag; a Z-filter; a hemispherical; or any element having a non-round cross-section. The method includes designing a nozzle arrangement to generate a jet of pressurized gas having a cross-sectional shape that is non-round and a same general shape as a non-round opening in a tubesheet. The nozzle arrangement includes at least one nozzle, each nozzle has an unobstructed flow channel, and each nozzle is cylindrical in shape and has at least one open slot.

In another aspect, a pressurized gas generator is provided. The pressurized gas generator includes a compressed air manifold storing pressurized gas, a valve in fluid communication with the manifold, and a nozzle arrangement. The nozzle arrangement includes at least a single nozzle connected to the valve. Each nozzle has a tubular wall and defines an interior channel. The interior channel is obstruction-free. The tubular wall defines at least one open slot. In some embodiments, the tubular wall is cylindrical. In other embodiments, the tubular wall is lobed.

BRIEF DESCRIPTION OF THE DRAWINGS

FIG. 4 is a perspective view of a nozzle utilized in the system of FIG. 3;

FIG. 4A is a perspective view of a variation of the nozzle illustrated in FIG. 4;

FIG. 5 is a perspective view of another embodiment of a nozzle that can be utilized in the arrangement of FIG. 3;

FIG. 6 is a perspective view of another embodiment of a pressurized gas generator and schematic view of an aperture of a filter element;

DETAILED DESCRIPTION

Figure 1:
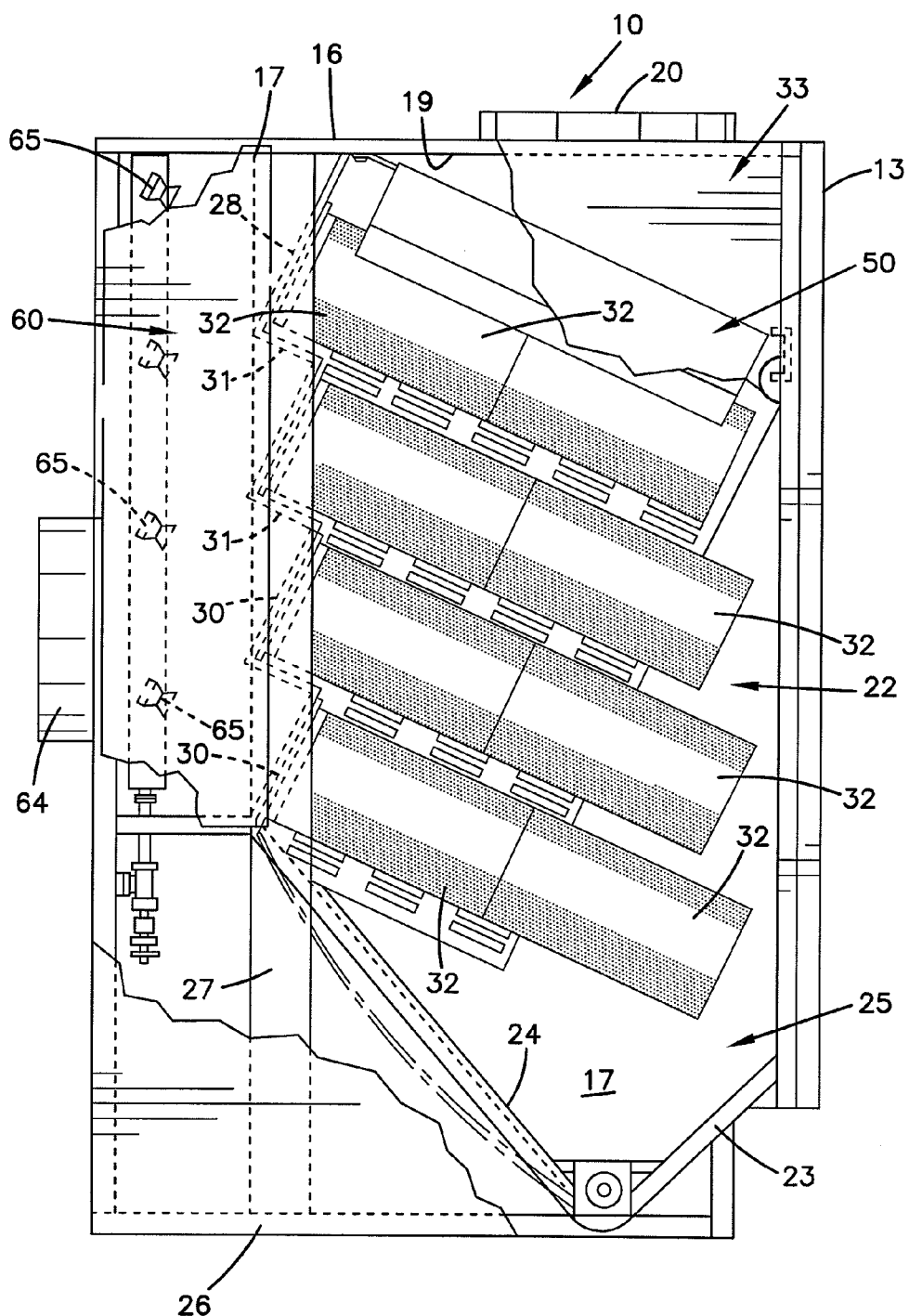
FIG. 1 is a side elevational view, partially broken away, of one embodiment of an air filter system utilizing pressurized gas to clean the filters.

An air filtration system or assembly is depicted generally at 10 in FIG. 1. The system depicted includes a side wall panel 17 being broken away to illustrate the arrangement of various portions of the assembly. An upper wall panel 16 has an inner wall surface 19. In this embodiment, an air inlet 20 is positioned in the upper wall panel 16 so that particulate-ladened air or other fluid is introduced into an unfiltered fluid chamber 22. The unfiltered fluid chamber 22 is defined by a door 13, the upper wall panel 16, two pair of opposing side wall panels 17, stepped wall structure or baffle arrangement 28, and a pair of sloping surfaces 23, 24. In this embodiment, the sloping surfaces 23, 24 partially define a collection area or hopper 25 within a base portion of the assembly. A bottom base panel or frame 26 is sealed to the side wall panels 17 in a suitable manner.

Secured to a structural frame member 27 along each of the side wall panels 17 is baffle member, spacer wall, or tubesheet structure 28, as mentioned above. In this embodiment, the tubesheet 28 has a step-like design to which are mounted individual filter elements 32. The tubesheet structure 28 is preferably sealed on all sides to effectively seal the unfiltered fluid chamber 22 from a filtered fluid chamber 60. In this embodiment, the structure 28 has three steps, with each step including an upwardly extending back member 30 and a leg member 31 extending at right angles therefrom.

In the embodiment shown, the filter elements 32 are mounted to the stepped, tubesheet structure 28, so that the filter elements 32 are mounted in the unfiltered air chamber 22 in a stepped or spaced apart overlapping relationship, and in this embodiment, in a generally downward direction at an acute angle of inclination with respect to a horizontal plane of the upper surface panel 16. In this manner, a distribution space 33 is defined in the uppermost portion of the filter assembly 10 by an inclined baffle 50, the side wall panels 17, the upper wall panel inner surface 19, and front access door 13. As unclean fluid enters the assembly 10 from the inlet 20, it is received into the distribution space 33 prior to being filtered.

Figure 2:
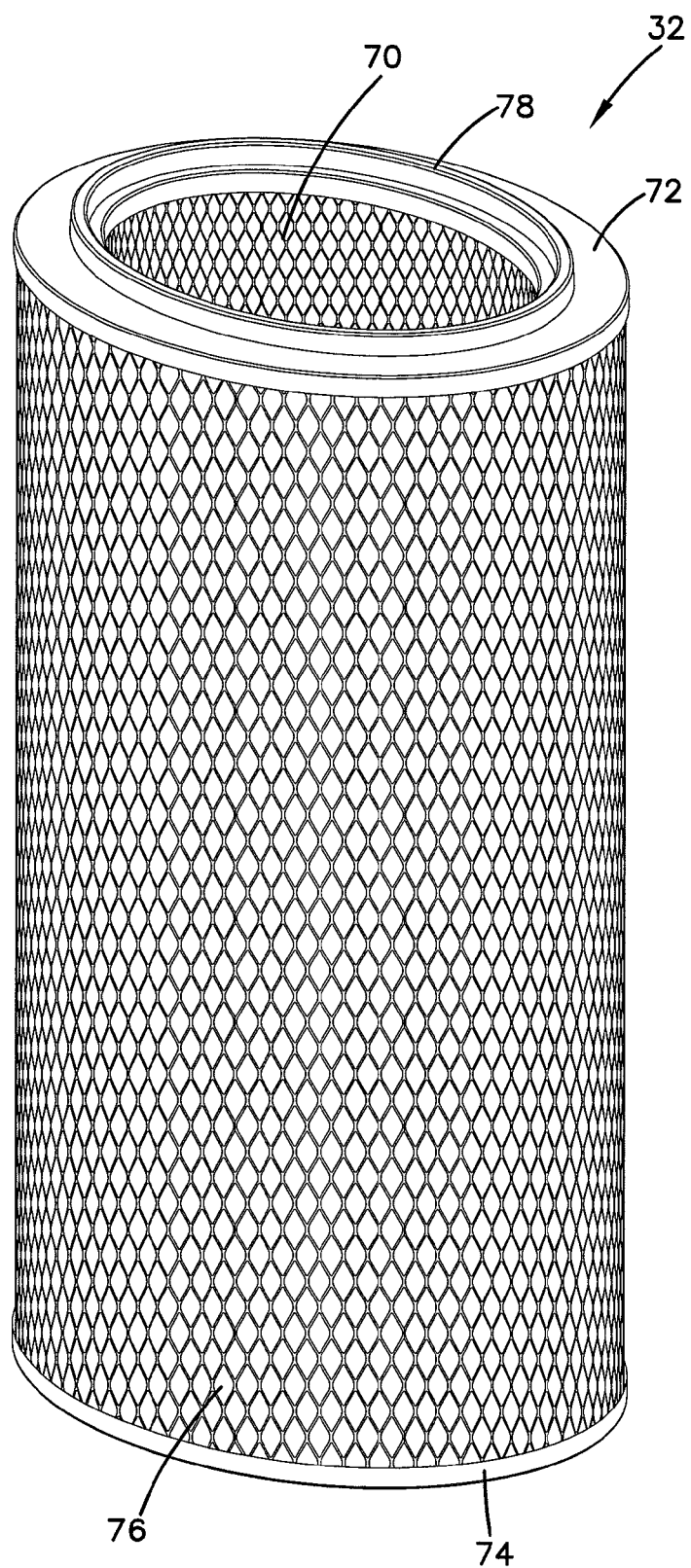
FIG. 2 is a perspective view of an example filter element having a non-round open interior which can be used in the system of FIG. 1.
Figure 16:
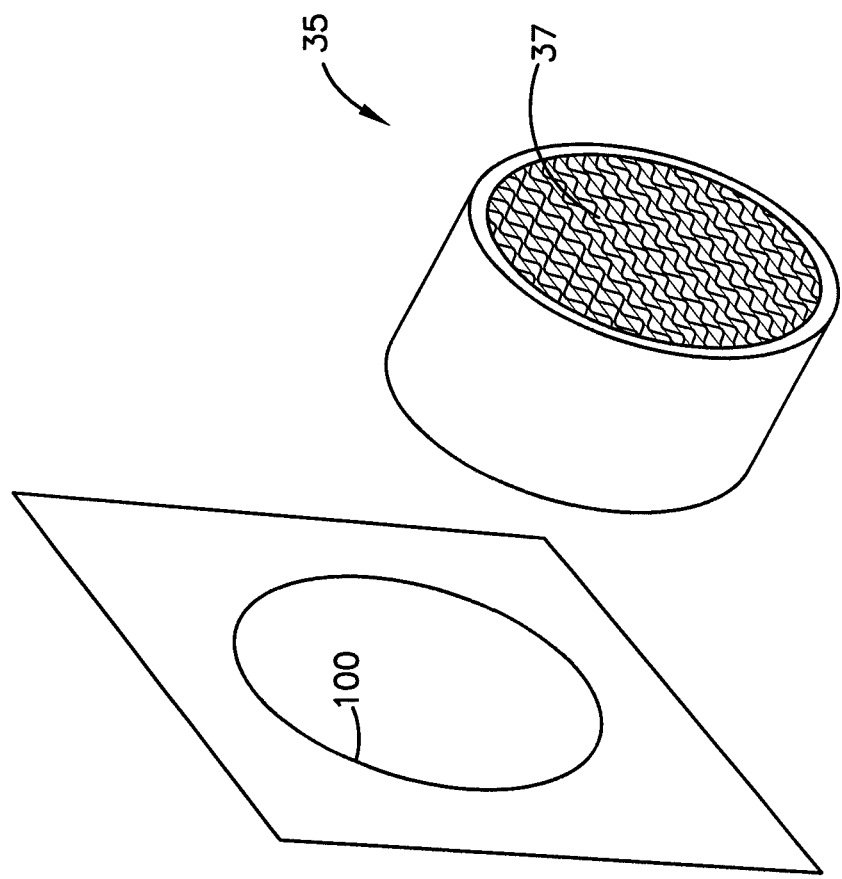
FIG. 16 is a perspective view of a tubesheet and panel filter arrangement that is usable with the nozzle arrangements of FIGS. 4 and 5.

Individual tubular filter elements 32, as used in this disclosure, will have non-round open filter interiors 70. As used herein, the term "tubular filter element" means that the element has filter media that circumscribes an interior volume. In those arrangements, the airflow turns a corner during the filtration process. For forward flow systems, the air flows from a region outside of the element, through the media, into the interior volume, and then turns a corner to exit the interior volume through an opening in one of the end caps. In reverse-flow systems, the air travel is the reverse of forward flow. In the embodiment of FIG. 2, the open filter interior 70 is oval in shape. The filter element 32, in the embodiment of FIG. 2, has a first end cap 72 and an opposite, second end cap 74. An extension of pleated media 76 extends between the end caps 72 and 74. An axial gasket 78 projects from the first end cap 72, such that it can be compressed to form an axial seal with the tubesheet 28. Individual panel filter elements 35 (FIGS. 16-18), as used in this disclosure, will have non-round filter faces and will accommodate straight-through flow. That is, the air will not have to turn a corner during the filtration process. In FIG. 16, the filter media 37 is Z-media, while in FIGS. 17 and 18, the filter media 39 is pleated media. By Z-media, it is meant media as described in, for example, U.S. Pat. Publication No. 2006/0112667 A1; U.S. Pat. Nos. 6,190,432; and 6,348,085, each incorporated herein by reference. Panel filter elements of Z-media, as depicted in FIG. 16 generally have opposite first and second ends; with the media comprising a plurality flutes; each of the flutes having a first end portion adjacent to the filter element first end, and a second end portion adjacent to the filter element second end; selected ones of the flutes being open at the first end portion and closed at the second end portion; and selected ones of the flutes being closed at the first end portion and open at the second end portion.

In reference again to FIG. 1, a system for cleaning each filter element 32 is provided. In the embodiment shown, the system includes a plurality of valves 65 positioned within filtered fluid chamber 60 and directly in line with an outlet opening in the tubesheet structure 28 so as to direct a jet of compressed air into the open interior 70.

In operation, fluid, such as air, to be filtered flows into the air filtration system 10 through the inlet 20. From there, it flows through the filter elements 32. The filter media 76 removes particulate material from the fluid. The filtered fluid flows into the open filter interior 70, through the holes in the tubesheet 28, and into the filtered fluid chamber 60. From there, the clean air flows through an outlet 64. Periodically, the filter elements 32 will be cleaned by pulsing a jet of air from the downstream side of the media 76 to the upstream side of the media 76. Specifically, a jet of pressurized gas will be directed through each of the valves 65. This will direct the jet through each opening in the tubesheet 28 and into the open filter interior 70. The jet of pressurized gas then flows through the media 76 from the downstream side to the upstream side. This helps to knock debris and particulate from the upstream side of the filter media 76, directing it to the hopper 17.

Figure 3:
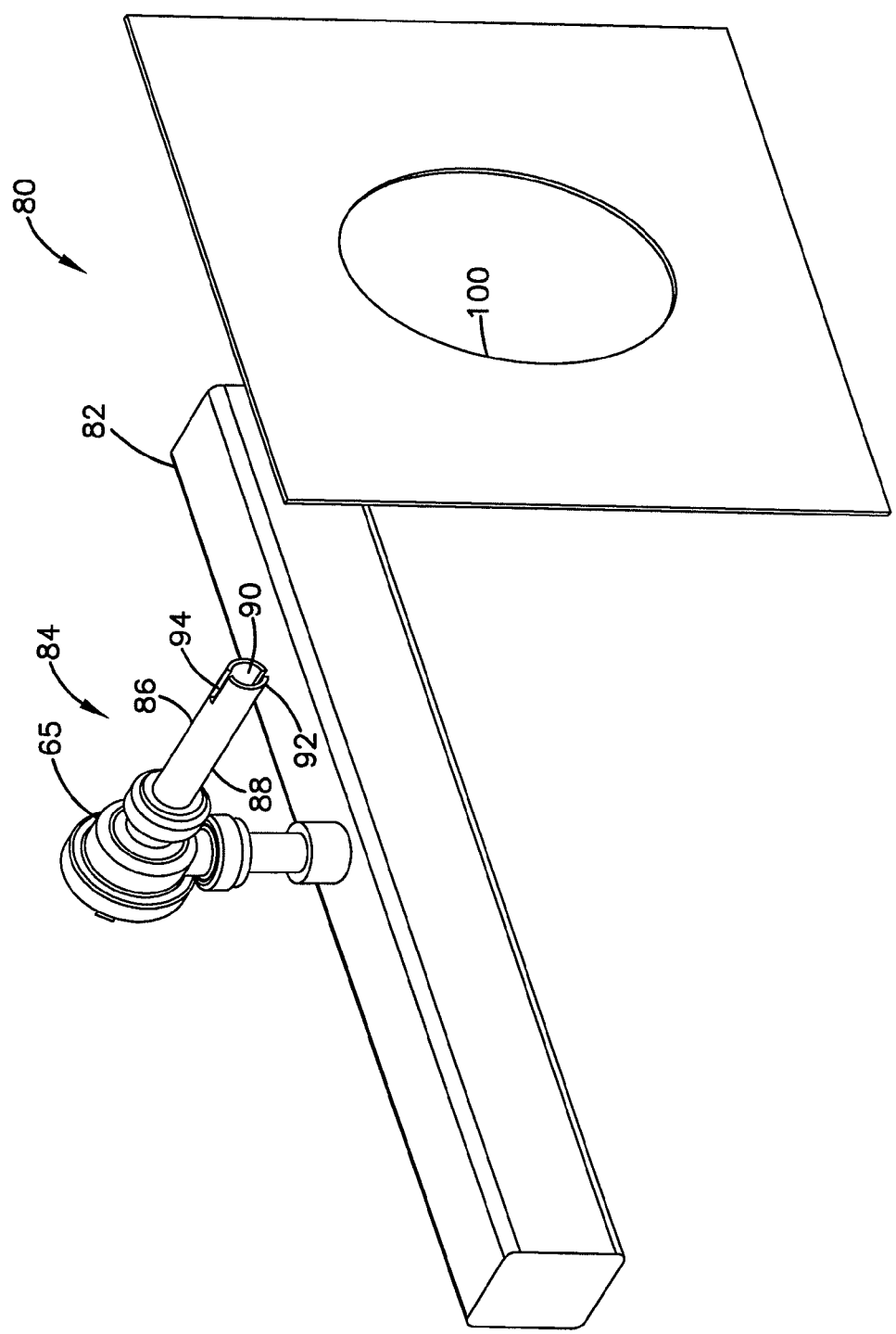
FIG. 3 is a perspective view of a pressurized gas generator including a compressed air manifold, a valve, a nozzle arrangement, and a schematic depiction of a non-round aperture of a filter.

FIGS. 3-18 show various pressurized gas generators and nozzle arrangements for use with, for example, air filter assembly 10. In FIG. 3, a first embodiment of a pressurized gas generator is depicted at 80. The pressurized gas generator 80 includes a compressed air manifold 82 storing pressurized gas. Valve 65, as shown in FIG. 1, is depicted in FIG. 3 in fluid communication with the manifold 82. A nozzle arrangement 84 is depicted connected to the valve 65. In the embodiment of FIG. 3, the nozzle arrangement 84 includes a single nozzle 86. The nozzle 86 has a tubular wall 88, and in the particular embodiment illustrated, is cylindrical which defines an interior channel 90. The interior channel 90 is obstruction-free. In other words, there are no splitters, obstructions, projections, or other materials within the channel 90 to alter the flow path of the pressurized jet. The obstruction-free channel 90 results in less turbulence, less noise, and a better use of the energy of the pressurized jet than in systems that have splitters or other obstructions within the channel 90.

In the embodiment of FIG. 3, the tubular wall 88 has a free end 92. Extending from the free end 92 is at least one open slot 94. In the embodiment of FIG. 3, there are two open slots 94. In this embodiment, the two slots 94 are spaced evenly from each other, about 180° apart (at the 12 o'clock and 6 o'clock position). Each slot extends less than 5 times the hydraulic diameter of the free end 92 of the nozzle 80, typically less than 2 hydraulic diameters of the free end 92 of the length of the nozzle 80, and in the embodiment shown, is about 1-1.5 times the hydraulic diameter of the overall length of the nozzle 80.

The nozzle 80, including the location and geometry of the slots 94, is adjusted in order to shape the pulse of the pressurized jet. The shape of the pressurized jet is designed to be the same shape as the opening 100 of a tubesheet, which may also match the cross-section of the interior 70 of the filter element 32. Aperture 100 is schematically shown in FIG. 3 at 100 to illustrate an example cross-sectional shape of open filter interior 70 of filter element 32. The nozzle 88, including the obstruction-free channel 90 and slots 94 will generate a jet of pressurized gas having a cross-sectional shape that matches the shape of the aperture 100. In the embodiment of FIGS. 3 and 16, the shape of the aperture 100 is oval, and is generally the same shape as: (i) the cross-sectional shape of the oval filter element 32 shown in FIG. 2; and (ii) the shape of the face of the panel filter 35 of FIG. 16.

FIG. 4 is an enlarged perspective view of the nozzle 86 shown in FIG. 3. FIG. 4A shows a perspective view of an alternate embodiment of the nozzle 86 of FIG. 4. In FIG. 4A, the nozzle 86' shows a single slot 94 defined by nozzle 88. An oval pulse shape can be generated from the embodiment of nozzle 86' by using the single slot 94, but it is preferred to use the two slot embodiment of nozzle 86 of FIG. 4. FIG. 5 illustrates another embodiment of a nozzle at 102, which also can be used to generate an oval shaped pulse. In the embodiment of FIG. 5, the nozzle 102 includes four slots 104. In the embodiment shown in FIG. 5, the slots 104 include two slots adjacent to each other separated by a strip 106, and another two slots 104 adjacent to each other and separated by a strip 108. The strips 106 and 108 are opposing each other, and are at, generally, the 12 o'clock and 6 o'clock position. The slot pairs are generally opposing each other, with the first slot pair being at the 11 o'clock and 1 o'clock position, and the second slot pair being at the 5 o'clock and 7 o'clock position.

Figure 7:
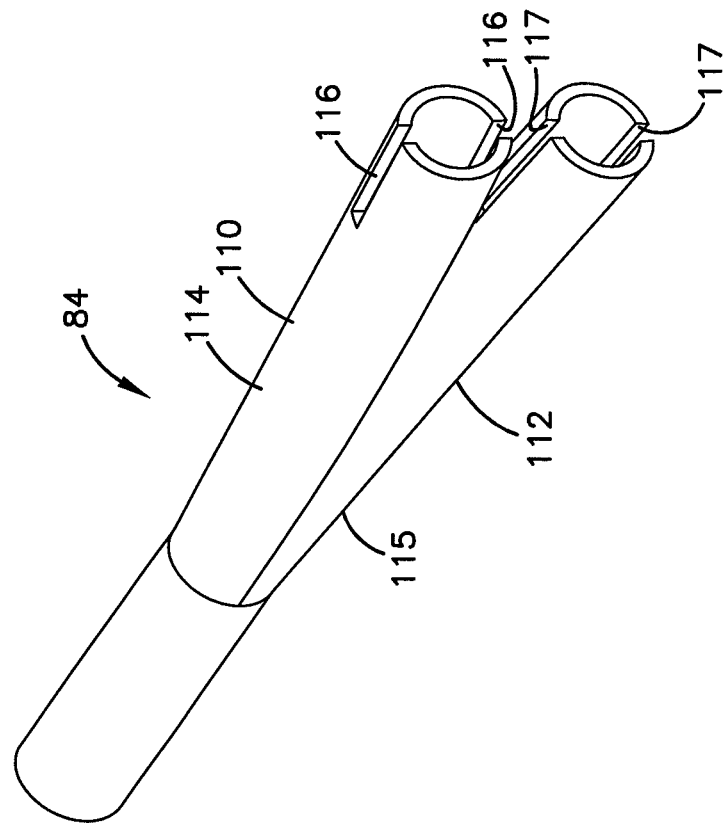
FIG. 7 is a perspective view of a nozzle arrangement utilized in the embodiment of FIG. 6.

FIG. 6 illustrates pressure gas generator 80 with nozzle arrangement 84, and in this embodiment, a pair of nozzles 110, 112. An enlarged view of nozzles 110, 112 is illustrated in FIG. 7. The nozzles 110, 112 are formed from open tubular members 114, 115 that are angled relative to each other. In the embodiment shown, the tubular members 114, 115 form an acute angle with respect to each other. In the particular embodiment illustrated, the tubular members 114, 115 are angled less than 45° relative to each other. Each of the nozzles 110, 112 have open slots 116, 117, respectively. The slots 116 are spaced approximately 180° apart, at the 12 o'clock and 6 o'clock positions. Likewise, the slots 117 are spaced 180° apart from each other, at approximately the 12 o'clock and 6 o'clock position. The nozzle arrangement 84 of FIGS. 6 and 7 can be used to generate an oval pulse shape to fill oval aperture 118 of FIG. 6. The aperture 118 is more elongated than the aperture 100 of FIG. 3.

Figure 8:
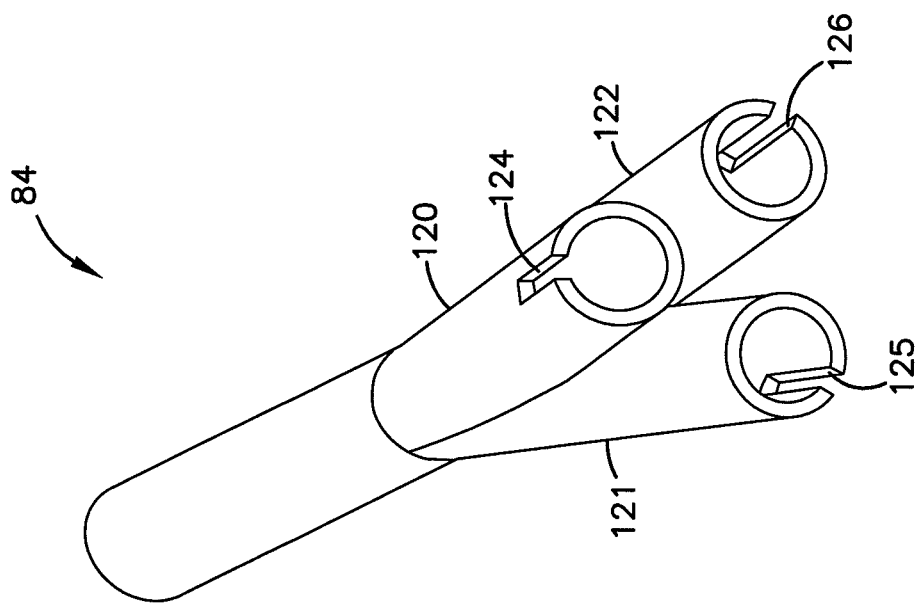
FIG. 8 is a perspective view of another embodiment of a nozzle arrangement that can be utilized in the system of FIG. 9 and FIG. 16.
Figure 9:
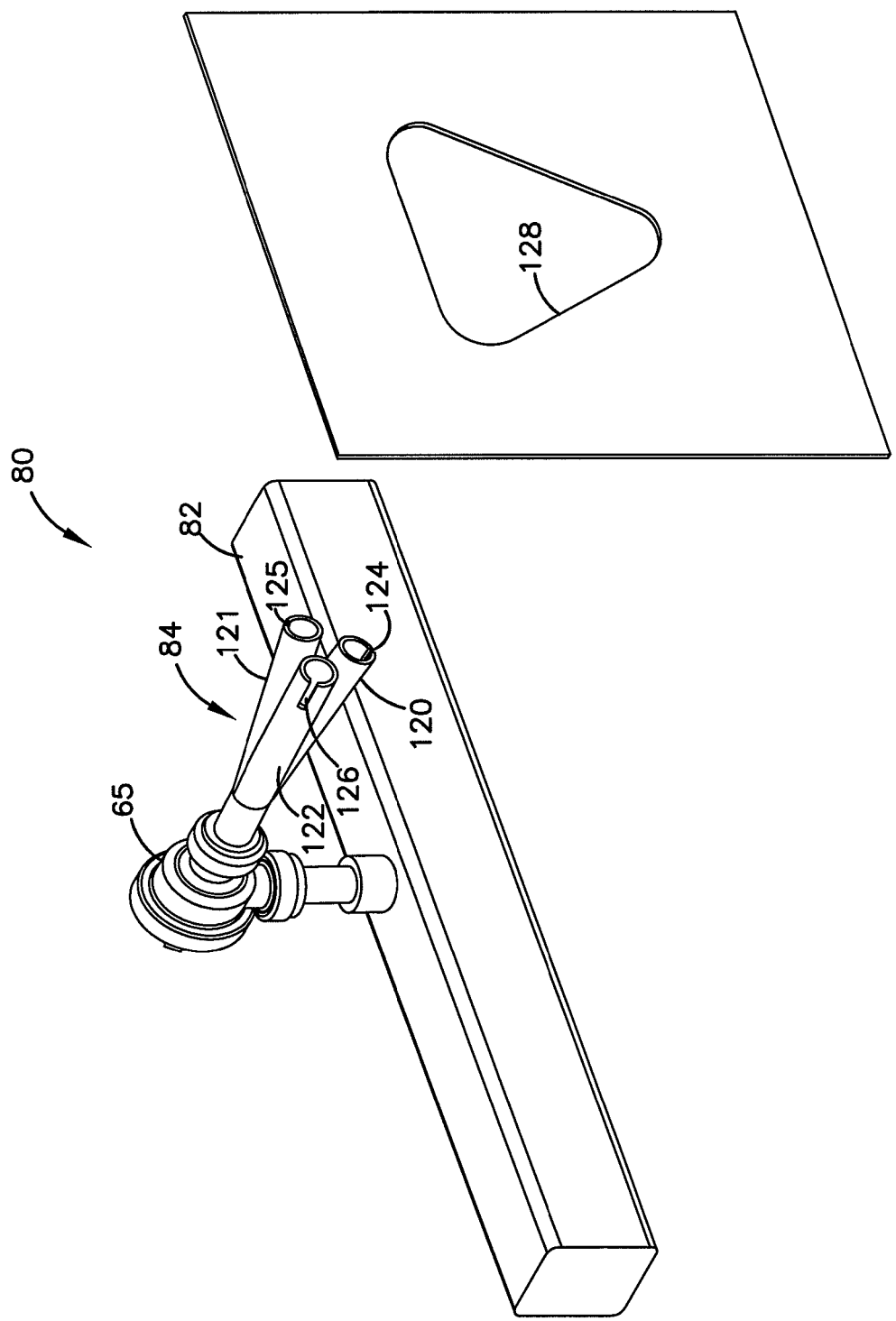
FIG. 9 is a perspective view of another embodiment of a pressurized gas generator and schematic view of an aperture of a filter element.

FIGS. 8 and 9 show another embodiment of nozzle arrangement 84. In this embodiment, there are three nozzles 120, 121, and 122. The three nozzles 120, 121, and 122 are angled with respect to each other, with each nozzle forming, in the embodiment shown, an acute angle with respect to the other two nozzles. In this embodiment, each nozzle 120, 121, and 122 has a single open slot 124, 125, and 126, respectively. As can be seen in FIG. 9, each of the slots 124, 125, 126 is located so that they are pointing away from adjacent respective nozzles 120, 121, 122. In other words, slot 126 is oriented so that it faces away from nozzle 121 and nozzle 120. Similarly, slot 124 is oriented so that it faces away from nozzle 121 and nozzle 122. Likewise, slot 125 is oriented to face away from nozzle 120 and 122.

Figure 17:
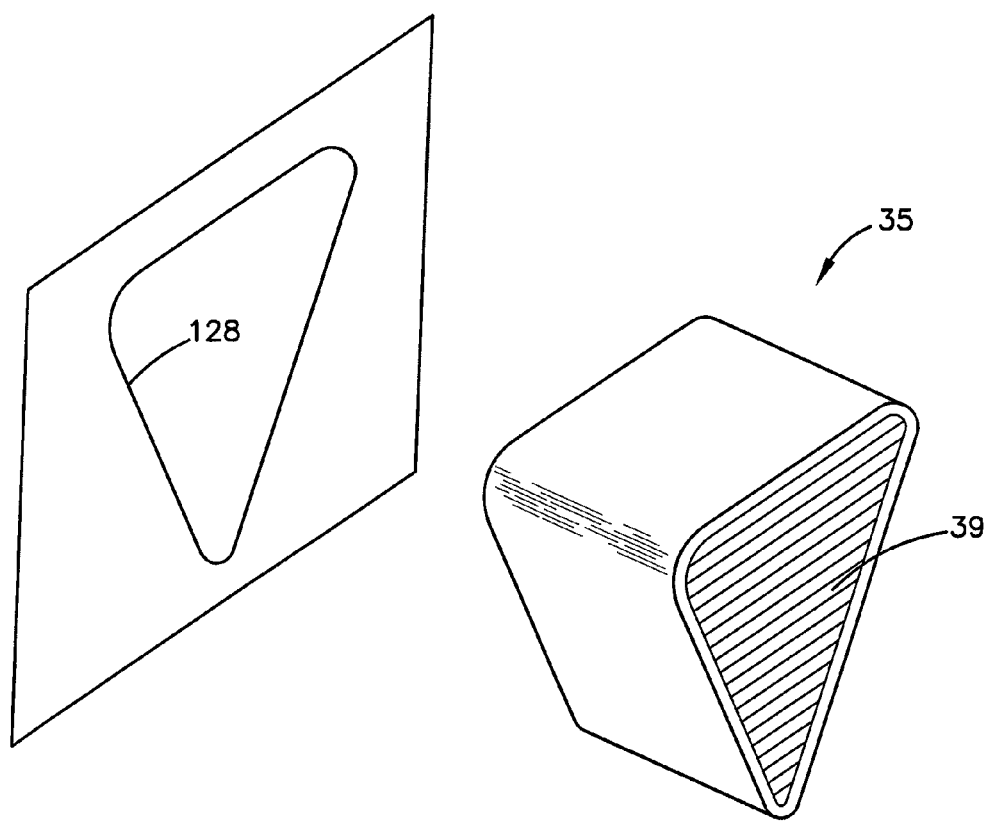
FIG. 17 is a perspective view of a tubesheet and panel filter arrangement that is usable with the nozzle arrangements of FIGS. 8 and 11.

The arrangement of FIGS. 8 and 9 results in a generally triangle shaped pulse to fill a generally triangle-shaped aperture 128. As can be seen in FIGS. 9 and 17, the aperture 128 is generally triangle but with rounded corners rather than sharp points at the corners.

Figure 10:
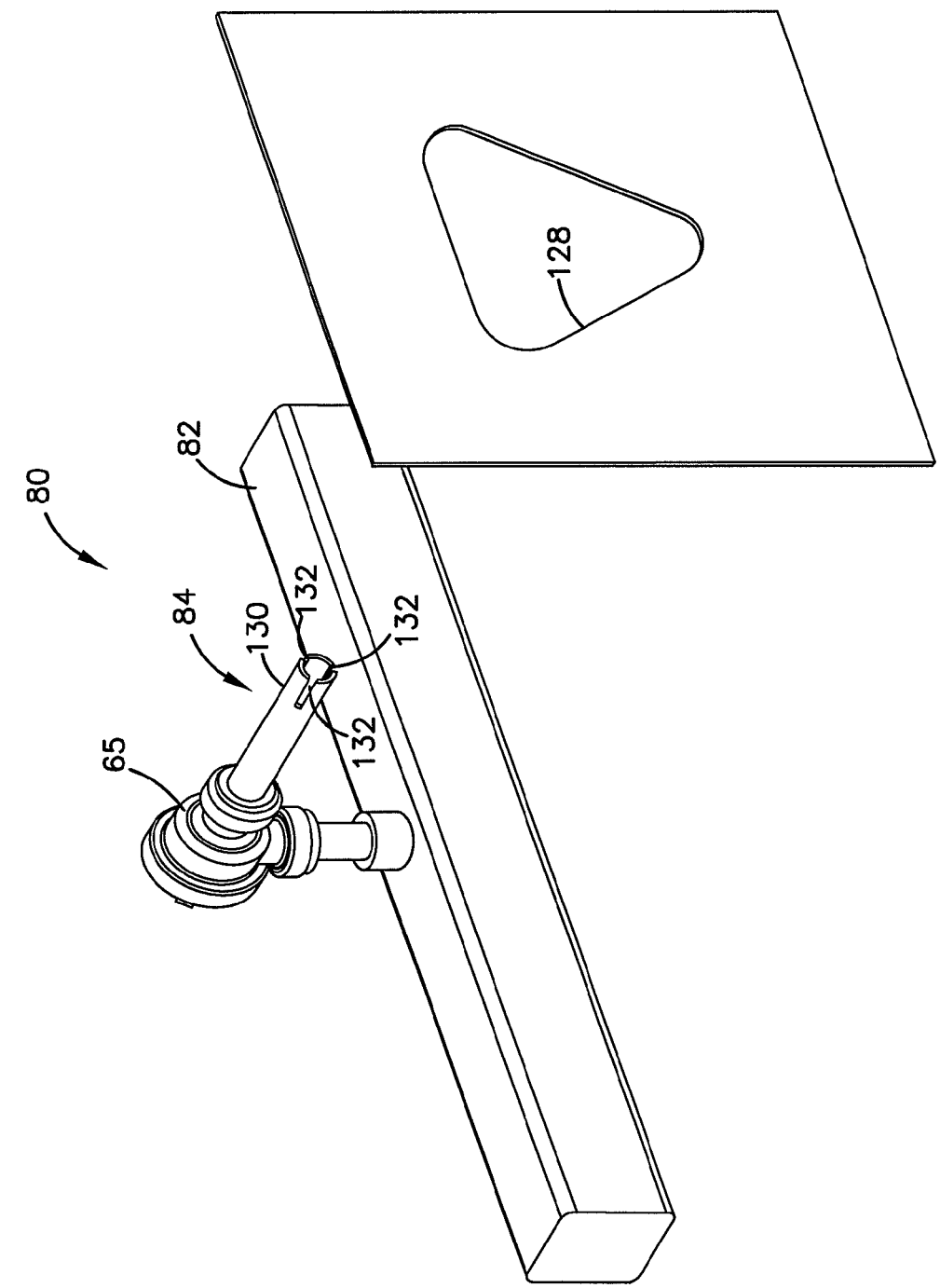
FIG. 10 is a perspective view of another embodiment of a pressurized gas generator and schematic view of an aperture of a filter element.
Figure 11:
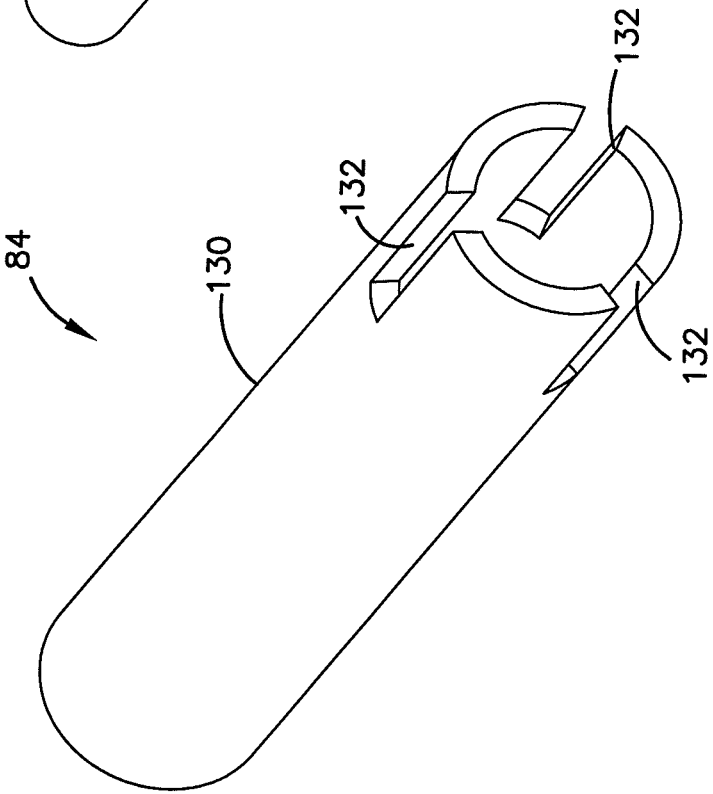
FIG. 11 is a perspective view of a nozzle arrangement utilized in the system of FIG. 10 and FIG. 17.

Another embodiment of a nozzle arrangement 84 that can be used to generate a triangle shaped pulse into generally triangular-shaped aperture 128 is illustrated in FIGS. 10 and 11. Nozzle 130, in this embodiment, is a single nozzle and defines three slots 132. The slots 132 are equally spaced relative to each other about the circumference of the nozzle 130. In this embodiment, the slots 132 are spaced about 60° apart, at the 12 o'clock, 4 o'clock and 8 o'clock positions.

Figure 12:
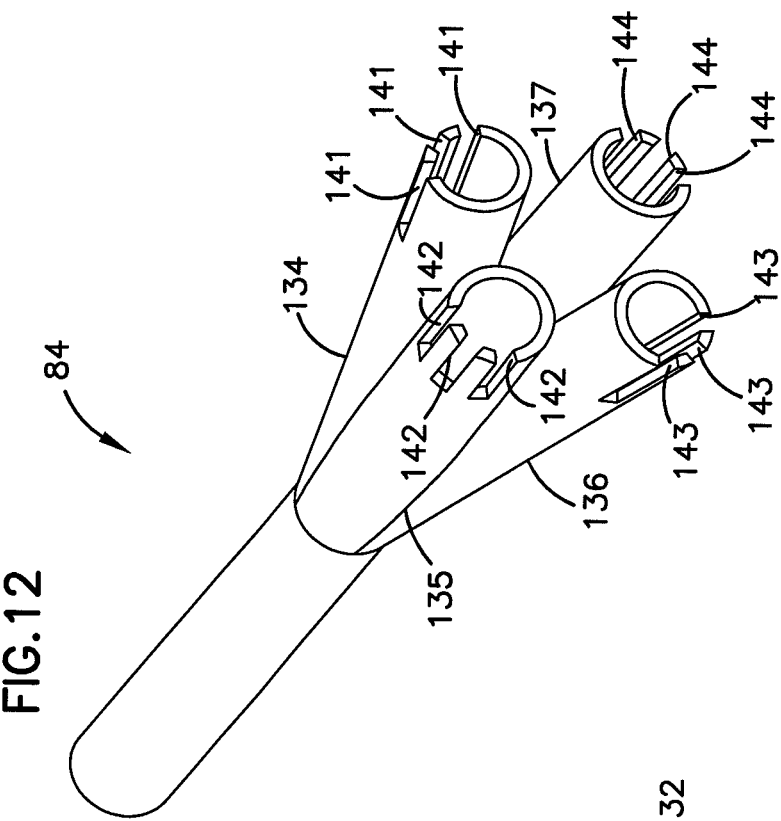
FIG. 12 is a perspective view of another embodiment of a nozzle arrangement that can be utilized in the system of FIG. 13 and FIG. 18.
Figure 13:
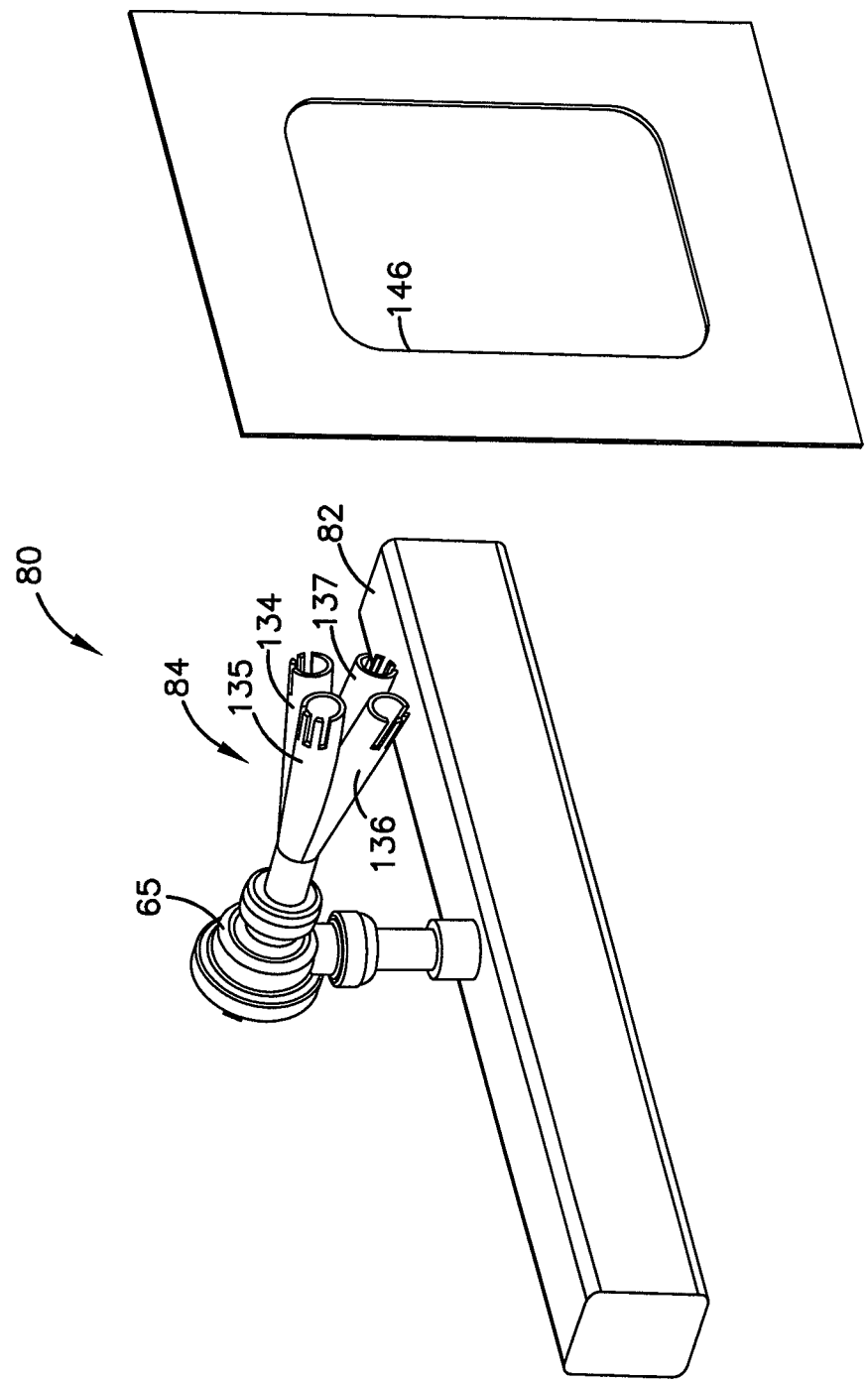
FIG. 13 is a perspective view of another embodiment of a pressurized gas generator and a schematic view of an aperture of a filter element.

Another embodiment of a nozzle arrangement 84 is illustrated in FIGS. 12 and 13.

In this embodiment, the nozzle arrangement 84 includes four nozzles 134, 135, 136, and 137. Each of the nozzles is angled with respect to an adjacent nozzle acutely, to form two opposing pairs of nozzles. For example, nozzles 135 and 137 are opposed to each other, and angled about 180° apart, while nozzles 134 and 136 are opposed to each other, and are spaced about 180° apart. Nozzles 134 and 135 are adjacent to each other with an acute angle therebetween, as is the case with nozzle 135 and 136; nozzle 136 and 137; and nozzle 137 and 134.

Each of nozzles 134, 135, 136, and 137 has four open slots 141, 142, 143 and 144, respectively. Each of the respective slots is arranged adjacent to each other, but oriented away from remaining portions of the other respective nozzles. For example, slots 141 are arranged in the 12 o'clock to 3 o'clock position of nozzle 134 and are pointed away from nozzles 135, 136, and 137. Slots 144 are arranged in the 3 o'clock to 6 o'clock position of nozzle 137 and are oriented away from nozzles 134, 136, and 135. Slots 143 are arranged in the 6 o'clock to 9 o'clock position of nozzle 134 and are oriented away from nozzles 134, 135, and 137. Slots 142 are arranged in the 9 o'clock to 12 o'clock position of nozzle 134 and are oriented away from nozzles 134, 136, and 137.

The nozzle arrangement 84 of FIGS. 12 and 13 is used to generate a generally rectangular shaped pulse. A generally rectangle shaped aperture is shown at 146 in FIGS. 13 and 18. The aperture 146 has rounded corners, but is otherwise generally rectangular in shape.

Figure 14:
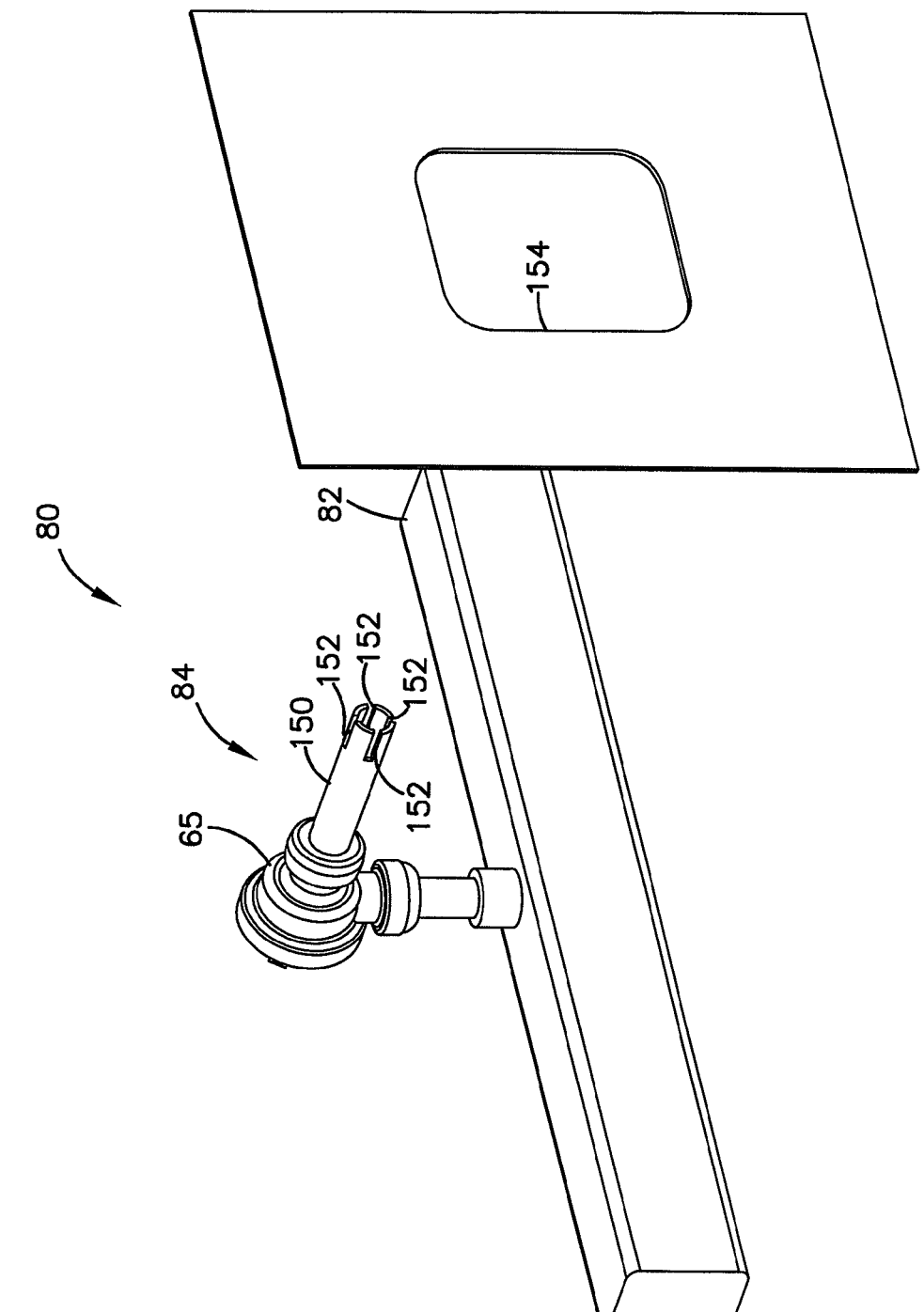
FIG. 14 is a perspective view of another embodiment of a pressurized gas generator and a schematic view of an aperture of a filter element.
Figure 15:
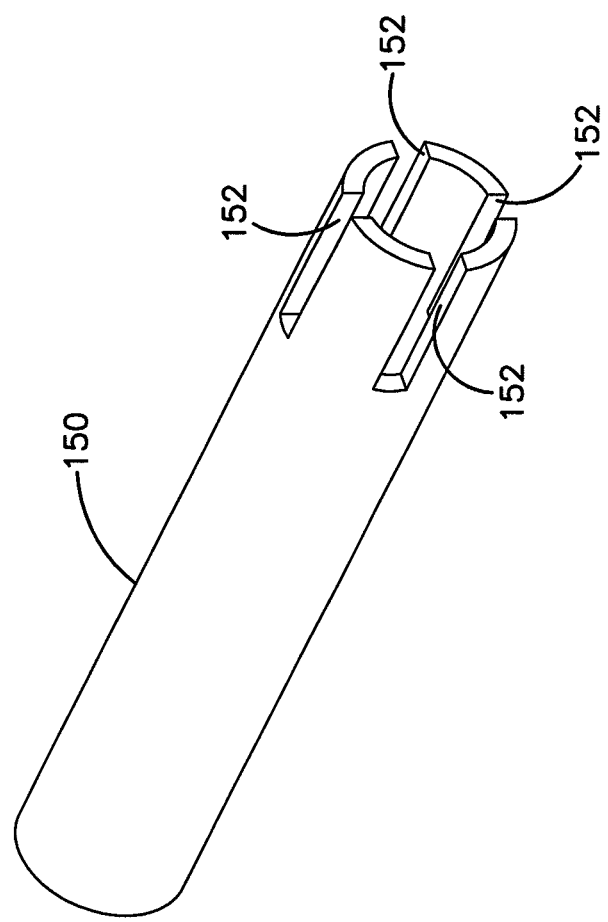
FIG. 15 is a perspective view of another embodiment of a nozzle arrangement that can be utilized in the system of FIGS. 13, 14, and 18.

FIGS. 14 and 15 show another embodiment of a nozzle arrangement 84. In this embodiment, the nozzle arrangement 84 is a single nozzle 150. The nozzle 150 includes four open slots 152. The slots 152 are evenly spaced about the circumference of the nozzle 150, about 90° from each other. As such, the slots 152 are located at the 12 o'clock, 3 o'clock, 6 o'clock, and 9 o'clock positions. The nozzle 150 generates a generally square shaped pulse for filling a generally square shaped aperture 154. The aperture 154 has rounded corners, but is otherwise square shaped.

Figure 18:
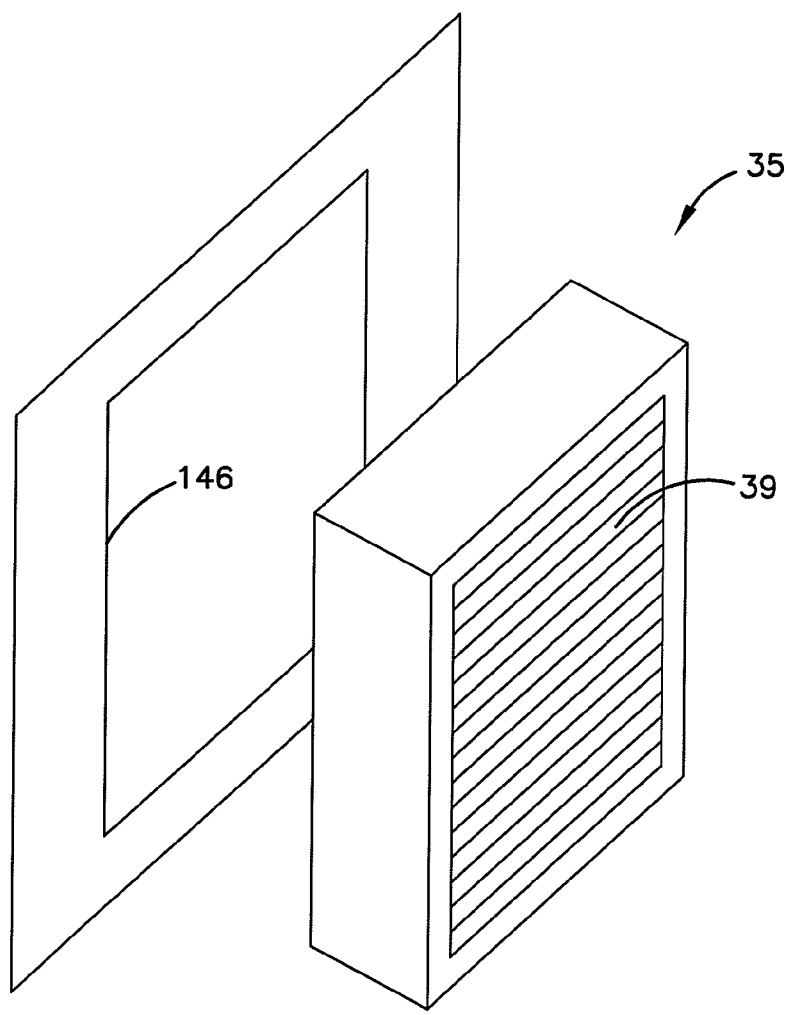
FIG. 18 is a perspective view of a tubesheet and panel filter arrangement that is usable with the nozzle arrangements of FIGS. 12 and 15.
Figure 19:
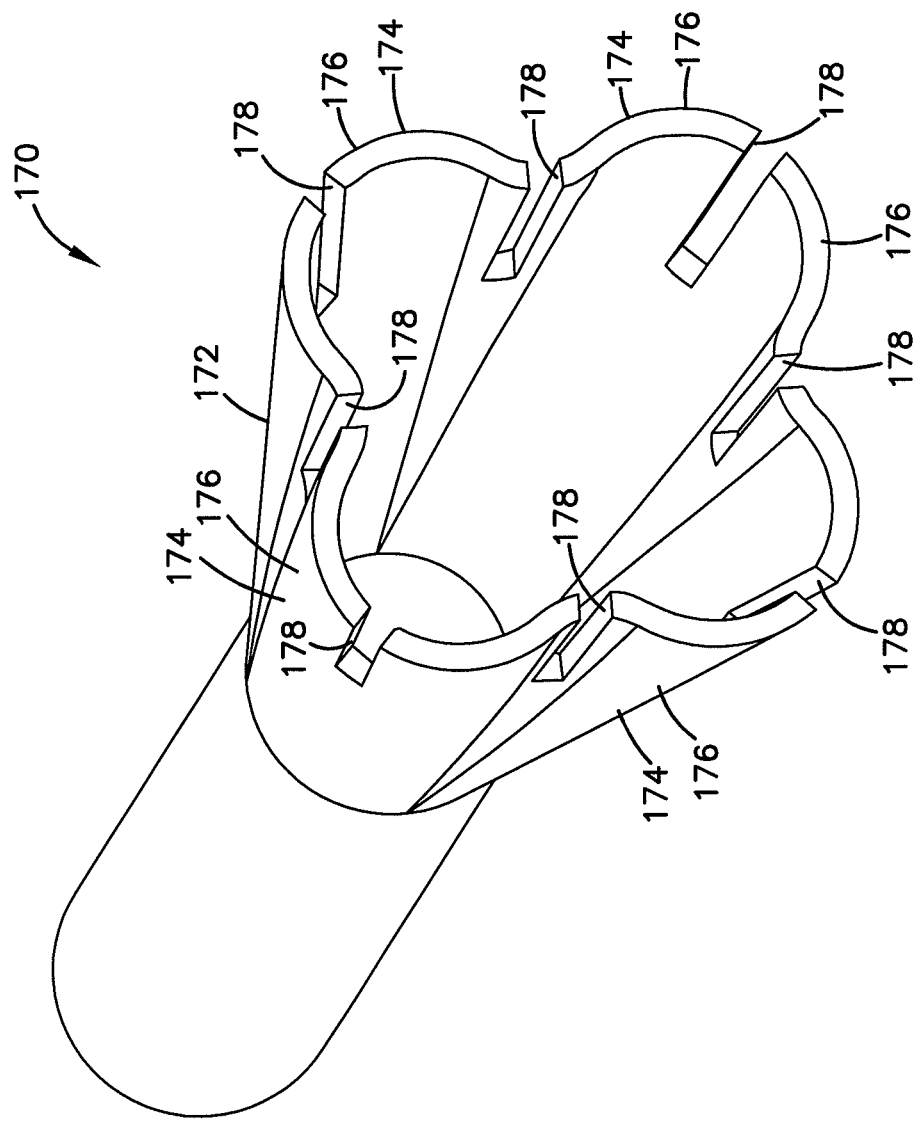
FIG. 19 is a perspective view of an embodiment of a lobed nozzle arrangement that can be utilized in the system of FIGS. 13, 14, and 18.

FIG. 19 is a perspective view of an alternate embodiment of a nozzle 170. Nozzle 170 has a tubular wall 172 which is obstruction-free, but unlike the above embodiments, tubular wall 172 in FIG. 19 is non-cylindrical. In the specific illustration of FIG. 19, wall 172 is lobed. In the embodiment shown, wall 172 includes a plurality of lobes 174, embodied as curved or rounded projections 176. Four lobes 174 are shown in FIG. 19, but depending on the desired pulse shape, more or less could be used. A plurality of slots 178 are defined by the wall 172, in this embodiment, symmetrically spaced about a center. The nozzle 170 is useable to generate a rectangular-shaped pulse that will fill the aperture 146 as shown in FIGS. 13 and 18 and the aperture 154 of FIG. 14.

It should be realized, that from the structures and arrangement described above, a method of cleaning a filter element can be utilized. The method includes directing a jet of pressurized gas from a nozzle, such as any of the various nozzle arrangements 84 illustrated above, into a non-round tubesheet aperture. The jet of pressurized gas will have a non-round, cross-sectional shape that is a same general shape as the non-round opening in the tubesheet. The nozzle used in the nozzle arrangement 84 will have a channel for the pressurized gas that is obstruction-free.

The method can include directing the jet having an oval cross-section into an oval-shaped opening, in a tubesheet. The step of directing the jet having an oval cross-section can include directing a jet of pressurized gas from not more than a single nozzle, the nozzle being tubular and defining at least two open slots. The step of directing can include directing a jet of pressurized gas from a tubular nozzle defining at least four open slots. Alternatively, the nozzle arrangement can include at least two nozzles, with each nozzle defining at least two open slots.

The step of directing can include directing a jet having a triangular cross-section into a generally triangular-shaped opening in a tubesheet. The step of directing can include directing a jet of pressurized gas from at least three nozzles, each of the nozzles being tubular and each nozzle defining no more than a single open slot. Alternatively, the step of directing can include directing a jet of pressurized gas from no more than a single nozzle, the nozzle being tubular and defining at least three open slots.

The step of directing can including directing a jet of having a rectangular cross-section into a generally rectangular-shaped opening in a tubesheet. The step of directing can including directing a jet of pressurized gas from at least four nozzles, each of the nozzles being tubular and each having at least three open slots. Alternatively, the step of directing can include directing a jet of pressurized gas from no more than a single nozzle, the nozzle being tubular and defining at least four open slots.

A method of designing a nozzle arrangement for directing a jet of pressurized gas for cleaning the filter element can be implemented using principles described above. The filter element can be: (i) tubular with a non-round cross-section; (ii) a panel filter element with a non-round face; (iii) a V-pack; (iv) a mini V-pack; (v) an envelope bag; or (vi) any filter that covers the non-round opening of the tubesheet. The method will include designing a nozzle arrangement to generate a jet of pressurized gas having a cross-sectional shape that is a same general shape as the non-round opening in the tubesheet. The nozzle arrangement will include at least one nozzle. Each nozzle has an unobstructed flow channel. Each nozzle is tubular in shape and has at least one open slot. The step of designing can include designing a nozzle arrangement to generate a jet of pressurized gas having, for example, an oval cross-sectional shape. The step of designing can include designing a nozzle arrangement to generate a jet of pressurized gas having a cross-sectional shape selected from the group consisting of oval, triangular, and rectangular (including square) to match a respectively-shaped: (i) filter element interior cross-section; or (ii) face of a panel filter element.

I claim:

1. A method of cleaning a filter element; the method comprising:
    (a) directing a jet of pressurized gas from a nozzle extending from a compressed air manifold of pressurized gas onto a filter element;
    (i) the jet having a non-round cross-sectional shape that is a same general cross-sectional shape as an aperture in a tube sheet supporting the filter element; and
    (ii) the nozzle including a wall defining a channel for the pressurized gas that is obstruction-free; the wall defining at least one open slot; the open slot being open at a free end of the wall and extending from an edge of the free end along the wall to be closed in board from the free end.

2. A method according to claim 1 wherein the step of directing includes directing a jet having an oval cross-section.

3. A method according to claim 2 wherein the step of directing a jet having an oval cross-section includes directing a jet having an oval cross-section onto either: (i) an open interior of a filter element having a same general oval cross-sectional shape; or (ii) an oval face of a panel filter element.

4. A method according to claim 1 wherein the step of directing includes directing a jet of pressurized gas from not more than a single nozzle, the nozzle wall being tubular and defining at least one open slot.

5. A method according to claim 1 wherein the step of directing includes directing a jet of pressurized gas from a nozzle, the nozzle wall being tubular and defining at least 4 open slots.

6. A method according to claim 1 wherein the step of directing includes directing a jet of pressurized gas from at least two nozzles, the walls of the nozzles being tubular, and each nozzle wall defining at least one open slot.

7. A method according to claim 1 wherein the step of directing includes directing a jet having a triangular cross-section.

8. A method according to claim 7 wherein the step of directing a jet having a triangular cross-section includes directing a jet having a triangular cross-section onto either: (i) an open interior of a filter element having a same general triangular cross-sectional shape; or (ii) a triangular face of a panel filter element.

9. A method according to claim 7 wherein the step of directing includes directing a jet of pressurized gas from at least three nozzles, each of the walls of the nozzles being tubular, and each nozzle wall defining no more than a single open slot.

10. A method according to claim 7 wherein the step of directing includes directing a jet of pressurized gas from no more than a single nozzle, the nozzle wall being tubular defining at least three open slots.

11. A method according to claim 1 wherein the step of directing includes directing a jet having a rectangular cross-section.

12. A method according to claim 11 wherein the step of directing a jet having a rectangular cross-section includes directing a jet having a rectangular cross-section onto either: (i) an open interior of a filter element having a same general rectangular cross-sectional shape; or (ii) a rectangular face of a panel filter element.

13. A method according to claim 11 wherein the step of directing includes directing a jet of pressurized gas from at least four nozzles, each of the nozzles walls being tubular, and each nozzle wall having at least three open slots.

14. A method according to claim 11 wherein the step of directing includes directing a jet of pressurized gas from no more than a single nozzle, the nozzle wall being tubular defining at least four open slots.

* * * * *